(12) United States Patent
Onda (10) Patent No.: US 6,246,834 B1
(45) Date of Patent: Jun. 12, 2001

(54) LENS BARREL

(75) Inventor: Kazuhiko Onda, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/598,970

(22) Filed: Jun. 22, 2000

(30) Foreign Application Priority Data

Jun. 23, 1999 (JP) .................................................. 11-176802

(51) Int. Cl.$^7$ .................................................. G03B 17/00
(52) U.S. Cl. .................. 396/85; 396/72; 359/823
(58) Field of Search .................. 396/72, 73, 75, 396/77, 83, 85, 144, 145, 341, 82; 359/822, 823

(56) References Cited

U.S. PATENT DOCUMENTS 4,958,178 * 9/1990 Yoshida ........................ 354/195.12

5,689,739   11/1997 Yoshida et al. .

FOREIGN PATENT DOCUMENTS 5-249362   9/1993 (JP) .
2548509    5/1997 (JP) .

* cited by examiner

Primary Examiner—Alan A. Mathews
Assistant Examiner—Arthur A. Smith
(74) Attorney, Agent, or Firm—Leydig, Voit & Mayer, Ltd.

(57) ABSTRACT

A lens barrel which can extend and retract with a simple structure without an increase in size includes a notched portion in a movable barrel. This lens barrel includes an intermediate barrel which can move along an optical axis of an optical system, accommodates a guide shaft directed to the optical axis, and has an angular cross section, and a movable barrel which has a notched portion with a notched angular shape, a bearing portion behind the notched portion through which the guide shaft extends, and extends and retracts with respect to the intermediate barrel.

5 Claims, 8 Drawing Sheets

LENS BARREL

BACKGROUND OF THE INVENTION

1. Field of the Invention

The present invention relates to an angular lens barrel used in an optical device such as a camera.

2. Related Background Art

Conventionally, as lens barrels in optical devices such as cameras, lens barrels having rectangular cross sections are known as disclosed in Japanese Patent Utility Model No. 2548509 and Japanese Patent Laid-Open No. 9-222550. These lens barrels cannot extend and retract in the same manner as in a cylindrical lens barrel that extends and retracts upon being rotated by a helicoid mechanism. For this reason, a link mechanism is placed in a lens barrel, and the lens barrel extends and retracts along the optical axis upon extension/contraction of the link mechanism.

According to the lens barrel disclosed in each reference described above, the link mechanism serves not only as a driving mechanism for applying extending force and retracting force to the lens barrel but also as a guide mechanism for moving the lens barrel along the optical axis. For this reason, the link mechanism needs to have certain rigidity, and link pieces and the like making up the link mechanism must be thick. As a consequence, the link mechanism becomes considerably thick as a whole, resulting in an increase in the size of the lens barrel In addition, to make the link mechanism serve as a guide mechanism, the link mechanism and associated peripheral structures must be accurately formed.

SUMMARY OF THE INVENTION

The present invention has been made in consideration of the above technical problems, and has as its object to provide a lens barrel which can accurately extend and retract with a simple structure without increasing its size.

In order to achieve the above object, according to the present invention, there is provided a lens barrel used in an optical system of an optical device, comprising a first barrel which can move along an optical axis of the optical system, accommodates a guide shaft directed to the optical axis, and has an angular cross section, and a second barrel which has a cross-sectional shape formed by partly notching an angular shape, has a bearing portion behind the notched portion through which the guide shaft extends, and can extend and retract with respect to the first barrel.

According to the present invention, the second barrel can be accurately extended along the optical axis of the optical system by guiding it along the guide shaft. In addition, the formation of the notched portion in the second barrel allows efficient use of the internal space of the first barrel in which the guide shaft is placed, thereby housing the second barrel therein. This makes it possible to accurately extend and retract the second barrel without increasing the size of the first barrel.

DESCRIPTION OF THE PREFERRED EMBODIMENTS

Various embodiments of the present invention will be described below with reference to the accompanying drawings. The same reference numerals denote the same parts throughout the drawings, and a repetitive description thereof will be avoided. The dimensional ratios in the drawings do not necessarily coincide with those in the description.

First Embodiment

Figure 1:
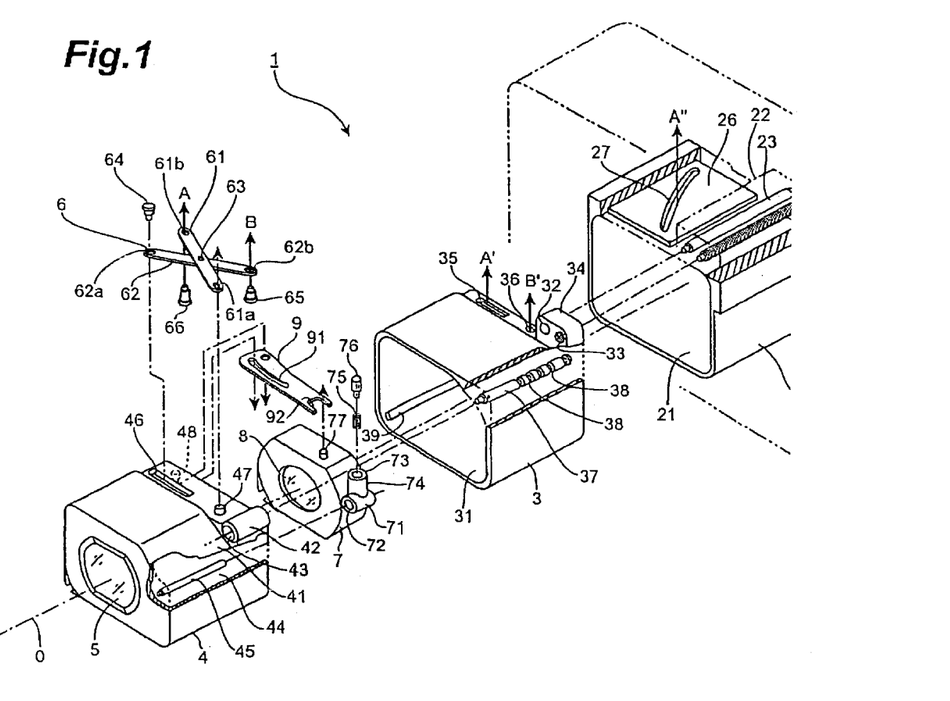
FIG. 1 is an exploded perspective view of a camera having a lens barrel according to an embodiment of the present invention.
Figure 2:
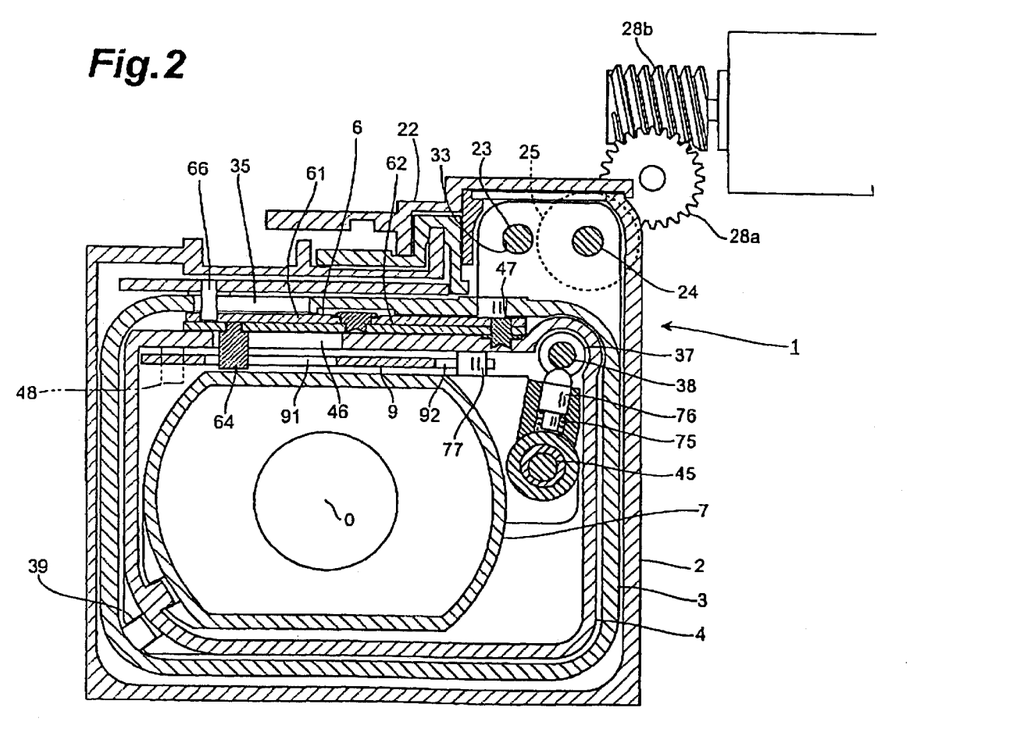
FIG. 2 is a front view of the camera having the lens barrel according to this embodiment.

FIG. 1 shows a camera 10 using a lens barrel 1 according to the first embodiment. FIG. 2 is a vertical sectional view showing the lens barrel 1 when viewed from the front in a collapsed state. The camera 10, to which the lens barrel 1 according to this embodiment is applied, is a still camera for taking pictures by using photographic films and has a front-group lens 5 and rear-group lens 8 as a photographing lens system.

As shown in FIG. 1, the camera 10 has a fixed barrel 2. The fixed barrel 2 is a barrel having an angular cross section. For example, the cross-sectional shape of the fixed barrel 2 is substantially rectangular, and it has an internal space 21. This fixed barrel 2 is fixed to the body of the camera 10 or integrally formed therewith.

In this case, "a barrel having an angular cross section" indicates a barrel having an angular, e.g., rectangular, cross section crossing the optical axis. In addition, "angular shape" indicates a shape having an angular portion and includes shapes other than circular shapes or a substantially angular shape having an angular portion which is partly or entirely round.

A guide shaft housing chamber 22 is formed in an upper portion of the fixed barrel 2. The guide shaft housing chamber 22 is formed by making the upper surface of the fixed barrel 2 protrude upward. A guide shaft 23 and feed screw 24 are housed in the guide shaft housing chamber 22. Both the guide shaft 23 and the feed screw 24 have rodlike shapes and extend parallel to the optical axis direction. The feed screw 24 is rotatably mounted and has a male thread formed on its outer surface. A helical gear 25 is mounted on the rear end of the feed screw 24. Rotational force of a motor 29 is transmitted to the helical gear 25 via a helical gear 28a and worm gear 28b. Upon transmission of this rotational force, the helical gear 25 rotates, and the feed screw 24 also rotates.

A cam plate 26 is mounted on the upper surface of the internal space 21 of the fixed barrel 2. A cam groove 27 is formed in the cam plate 26 obliquely with respect to an optical axis O.

The camera 10 has an intermediate barrel 3 that can extend and retract with respect to the fixed barrel 2. The intermediate barrel 3 is a barrel having an angular cross section, e.g., a substantially rectangular cross section. The intermediate barrel 3 has an internal space 31 and a projection 34 formed on an upper portion of the rear end. Two through holes 32 and 33 are formed in the projection 34 in the optical axis direction. The through hole 32 is a hole through which the guide shaft 23 of the fixed barrel 2 extends. Extending the guide shaft 23 through this through hole 32 allows the intermediate barrel 3 to move along the optical axis O.

The through hole 33 is a hole through which the feed screw 24 of the fixed barrel 2 extends. A female thread is formed in the inner surface of the through hole 33 to threadably engage with the male thread of the feed screw 24. As the feed screw 24 extending through the through hole 33 rotates, the intermediate barrel 3 moves along the optical axis O.

The intermediate barrel 3 is partly or entirely housed in the internal space 21 of the fixed barrel 2 either when the intermediate barrel 3 extends or when it retracts. For the sake of descriptive convenience, FIG. 1 shows a state wherein the intermediate barrel 3 is removed from the fixed barrel 2.

An elongated hole 35 and round hole 36 are formed in an upper portion of the rear end of the intermediate barrel 3 to extend through the internal space 31. The elongated hole 35 is formed such that its longitudinal direction is perpendicular to the optical axis O. The round hole 36 is formed next to the elongated hole 35 and located on an extended line of the elongated hole 35 in the longitudinal direction.

A guide shaft 37 is mounted in the internal space 31 of the intermediate barrel 3. The guide shaft 37 has a rodlike shape and is disposed in the optical axis direction. A plurality of grooves 38 are formed in the outer surface of the guide shaft 37. The grooves 38 are annular grooves formed along the circumferential direction of the guide shaft 37. The grooves 38 are formed at predetermined intervals in the axial direction of the guide shaft 37. For example, five grooves 38 are formed. The guide shaft 37 is disposed at an upper corner portion of the internal space 31 below the guide shaft 23. A guide projection strip 39 is formed on a lower corner of the inner wall of the intermediate barrel 3 at a diagonal position with respect to the guide shaft 37.

The camera 10 has a movable barrel 4 that can extend and retract with respect to the intermediate barrel 3. The movable barrel 4 is a barrel having a cross-sectional shape obtained by notching one corner of a rectangle, and has a notched portion 41. The front-group lens 5 is housed in a front surface portion of the movable barrel 4. The rear end of the movable barrel 4 is open.

A bearing portion 42 is formed behind the notched portion 41 of the movable barrel 4. The bearing portion 42 bears the guide shaft 37 of the intermediate barrel 3 and has a through hole 43 in the optical axis direction. The through hole 43 is a hole through which the guide shaft 37 extends. Extending the guide shaft 37 through the through hole 43 allows the movable barrel 4 to move along the optical axis O. The movable barrel 4 is partly or entirely housed in the internal space 31 of the intermediate barrel 3 either when the movable barrel 4 extends or when it retracts. For the sake of descriptive convenience, FIG. 1 shows a state wherein the movable barrel 4 is removed from the intermediate barrel 3.

A guide shaft 45 is mounted in an internal space 44 of the movable barrel 4. The guide shaft 45 has a rodlike shape and is positioned in the optical axis direction. An elongated hole 46 is formed in an upper portion of the rear end of the movable barrel 4 to extend through the internal space 44. The elongated hole 46 is formed such that its longitudinal direction is perpendicular to the optical axis O. A projection 47 is formed on an extended line of the elongated hole 46 in the longitudinal direction.

The camera 10 has an X-shaped link mechanism 6 for extending and retracting the movable barrel 4. The link mechanism 6 is formed by putting two links 61 and 62 in an X shape and axially supporting the intersection with a shaft pin 63. A front end 61a of the link 61 is axially fitted on the projection 47 of the movable barrel 4. A pin 64 extends through a front end 62a of the link 62 from above. This pin 64 also extends through the elongated hole 46 of the movable barrel 4. This allows the front end 62a of the link 62 to move along the opening direction of the elongated hole 46, but prevents the front end 62a from moving in other directions.

As indicated by an arrow B in FIG. 1, a pin 65 extends through a rear end 62b of the link 62 from below. This pin 65 extends through the round hole 36 of the intermediate barrel 3, as indicated by an arrow B' in FIG. 1. With this structure, the rear end 62b of the link 62 is axially fitted in the round hole 36 to be pivotal at its opening position. As indicated by an arrow A in FIG. 1, a pin 66 extends through a rear end 61b of the link 61 from below. This pin 66 also extends through the elongated hole 35 of the intermediate barrel 3, as indicated by an arrow A' in FIG. 1. This allows the rear end 61b of the link 61 to move along the opening direction of the elongated hole 35, but prevents the rear end 61b from moving in other directions.

In addition, the pin 66 extends through the cam groove 27 of the cam plate 26 placed on the fixed barrel 2, as indicated by an arrow A" in FIG. 1. With this structure, as the intermediate barrel 3 moves along the optical axis O with respect to the fixed barrel 2, the pin 66 moves along the cam groove 27, thereby changing the crossing angle between the links 61 and 62 of the link mechanism 6. With this change in crossing angle, the link mechanism 6 extends or contracts in the optical axis direction, and the movable barrel 4 moves relative to the intermediate barrel 3, thereby extending or retracting the movable barrel 4.

The camera 10 has a rear-group lens frame 7 that moves along the optical axis O behind the front-group lens 5 of the movable barrel 4. The rear-group lens frame 7 accommodates the rear-group lens 8 and has a bearing portion 71 on an outer edge portion of the frame 7. A bearing hole 72 is formed in the bearing portion 71 to be parallel to the optical axis direction. The bearing hole 72 is a hole through which the guide shaft 45 of the movable barrel 4 extends. Extending the guide shaft 45 through the bearing hole 72 allows the rear-group lens frame 7 to move along the optical axis O. The rear-group lens frame 7 is entirely or partly housed in the internal space 44 or 31 of the movable barrel 4 or intermediate barrel 3 either when the rear-group lens frame 7 extends or when it retracts. For the sake of descriptive convenience, however, FIG. 1 shows a state wherein the rear-group lens frame 7 is removed from the movable barrel 4 or intermediate barrel 3.

As shown in FIG. 2, a press portion 73 is formed on an upper portion of the bearing portion 71 of the rear-group lens frame 7. The press portion 73 elastically presses the guide shaft 37 mounted on the intermediate barrel 3. For example, the press portion 73 is formed by housing a coil spring 75 and press member 76 in a cylindrical portion 74 whose upper surface is open. The press member 76 is a rodlike member having a hemispherical head portion that is pressed against the outer surface of the guide shaft 37 with the biasing force of the coil spring 75.

The press member 76 is placed between the guide shaft 37 and the guide shaft 45 and located on, for example, a line connecting the axis of the guide shaft 37 and the axis of the guide shaft 45. With this structure, the guide shaft 45 can receive the reaction force of the press member 76 that presses the guide shaft 37. This can prevent rotational force around the guide shaft 45 from acting on the rear-group lens frame 7 upon pressing by the press member 76, thus properly moving the rear-group lens frame 7 along the optical axis O.

This press portion 73 may be formed by a leaf spring or another elastic member as long as it can elastically press the guide shaft 37.

As shown in FIG. 1, the camera 10 has a cam lever 9. The cam lever 9 is used to move the rear-group lens frame 7 along the optical axis O, and pivotally fitted on a projection 48 extending from the inner wall of the internal space 44 of the movable barrel 4. A cam groove 91 is formed in the cam lever 9. The pin 64 extending through the front end 62a of the link 62 and the elongated hole 46 extends through the cam groove 91. A notched portion 92 is formed at the distal end of the cam lever 9. The notched portion 92 is locked to a projection 77 extending from the upper surface of the rear-group lens frame 7.

When the movable barrel 4 extends or retracts, the cam lever 9 pivots on the projection 48 as the pin 64 moves along the elongated hole 46. With this pivotal movement, the projection 77 is pressed by the notched portion 92, and the rear-group lens frame 7 moves along the optical axis O.

The width of the notched portion 92 is larger than the diameter of the projection 77. Therefore, when the pivoting direction of the cam lever 9 changes, the rear-group lens frame 7 does not move in an opposite direction unless the cam lever 9 pivots by an amount equal to or more than the difference between the width of the notched portion 92 and the diameter of the projection 77.

Note that a projection may be formed on the cam lever 9 and a notched portion, groove, or the like may be formed in the rear-group lens frame 7 to allow the rear-group lens frame 7 to move as the cam lever 9 pivots.

The operation of the camera 10 having the lens barrel 1 will be described next.

FIGS. 3 to 7 are horizontal sectional views of the lens barrel portion of the camera 10.

Figure 3:
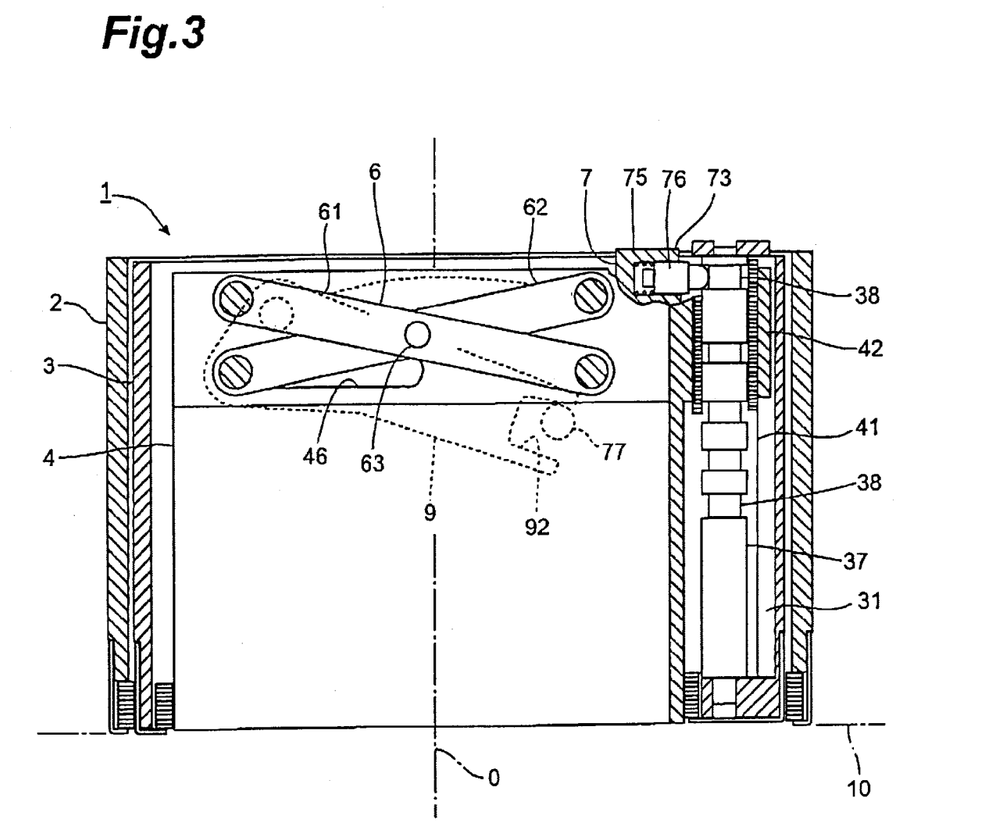
FIG. 3 is a view for explaining the operation of the camera having the lens barrel according to this embodiment.

As shown in FIG. 3, in a collapsed state, the intermediate barrel 3 is retracted into the fixed barrel 2, and the movable barrel 4 is retracted into the intermediate barrel 3. In this case, the link mechanism 6 is collapsed in the rear end portion of the movable barrel 4 and intermediate barrel 3, and is just housed in the rear end portion so as not to show outside the camera 10 even when the movable barrel 4 and intermediate barrel 3 extend to the maximum degree. The formation of the notched portion 41 in the movable barrel 4 allows the movable barrel 4 to retract into the intermediate barrel 3 having the guide shaft 37 inside. By efficiently using the internal space 31 of the intermediate barrel 3 in this manner, the sizes of the intermediate barrel 3 and camera 10 can be reduced. In addition, the movable barrel 4 can be maximized in size in the intermediate barrel 3.

In the collapsed state, the press member 76 of the press portion 73 of the rear-group lens frame 7 is inserted into the grooves 38 of the guide shaft 37, and the rear-group lens frame 7 is held with respect to the intermediate barrel 3.

When the main switch of the camera 10 is turned on, the motor 29 is driven to transmit its driving force to the helical gear 25 via the worm gear 28b and helical gear 28a, and the helical gear 25 starts rotating, as shown in FIG. 2. As the helical gear 25 rotates, the feed screw 24 rotates in the fixed barrel 2, and the intermediate barrel 3 moves along the optical axis O to extend the fixed barrel 2. At this time, since the motor 29 is sufficiently decelerated owing to the threadably-engaging structure made up of the feed screw 24 and through hole 33, part of a deceleration means for deceleration can be omitted.

Figure 4:
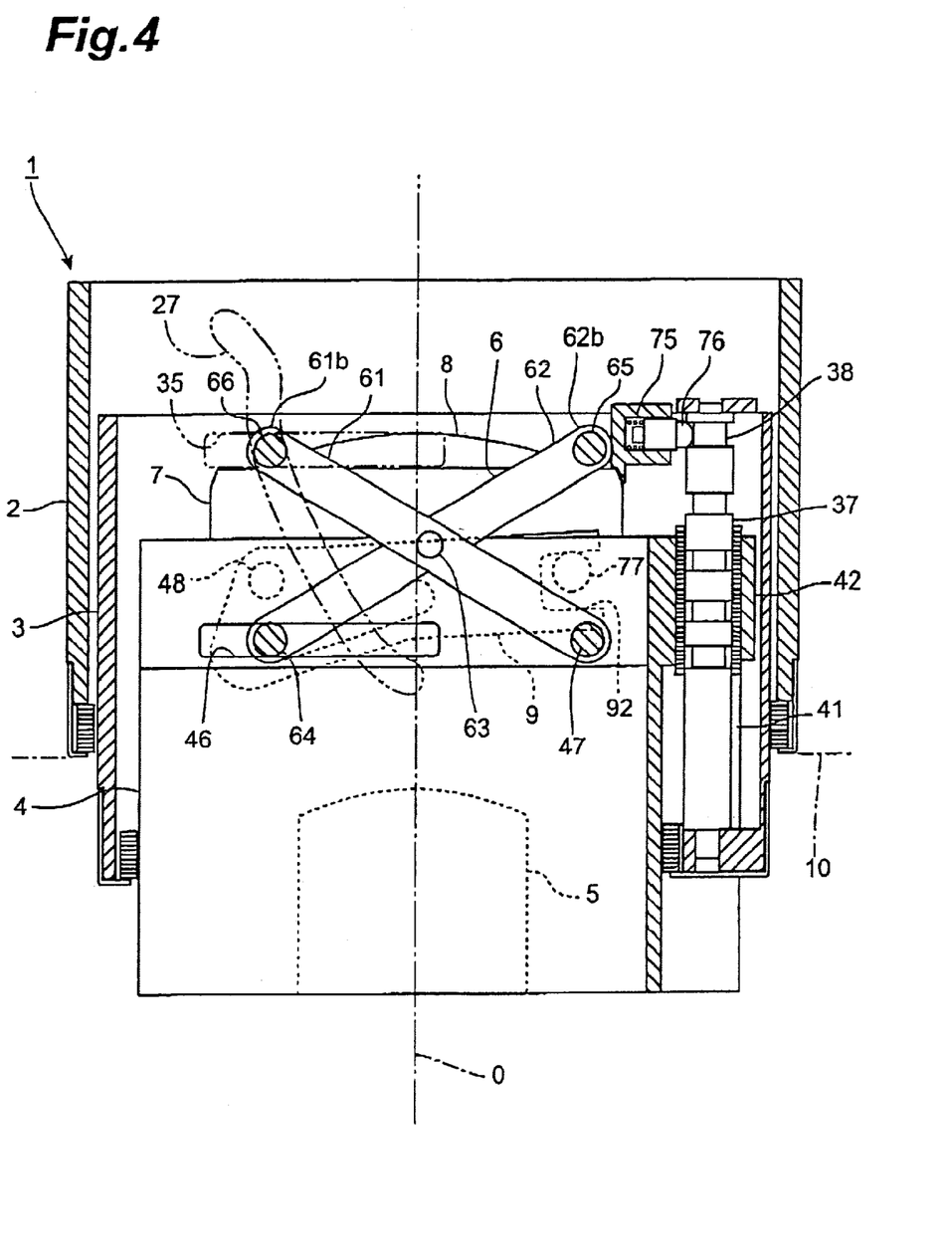
FIG. 4 is a view for explaining the operation of the camera having the lens barrel according to this embodiment

As shown in FIG. 4, when the fixed barrel 2 moves, the rear end 61b of the link 61 of the link mechanism 6 moves along the cam groove 27. As the fixed barrel 2 moves, therefore, the rear end 61b of the link 61 moves toward the rear end 62b of the link 62, and the crossing angle between the links 61 and 62 increases. The collapsed link mechanism 6 then extends in the optical axis direction. As a consequence, the movable barrel 4, to which the front ends 61a and 62a of the links 61 and 62 of the link mechanism 6 are locked, extends from the intermediate barrel 3 to a photographing position (WIDE standby position).

While the movable barrel 4 accommodating the front-group lens 5 moves from the collapsing position to the WIDE standby position, the rear-group lens frame 7 accommodating the rear-group lens 8 moves along the optical axis direction up to the WIDE standby position while being held in the fixed barrel 2.

When the shutter switch is pressed in this state, the motor 29 rotates in the reverse direction, and the feed screw 24 rotates in the reverse direction via the worm gear 28b and helical gears 28a and 25, thereby retracting the intermediate barrel 3.

Figure 5:
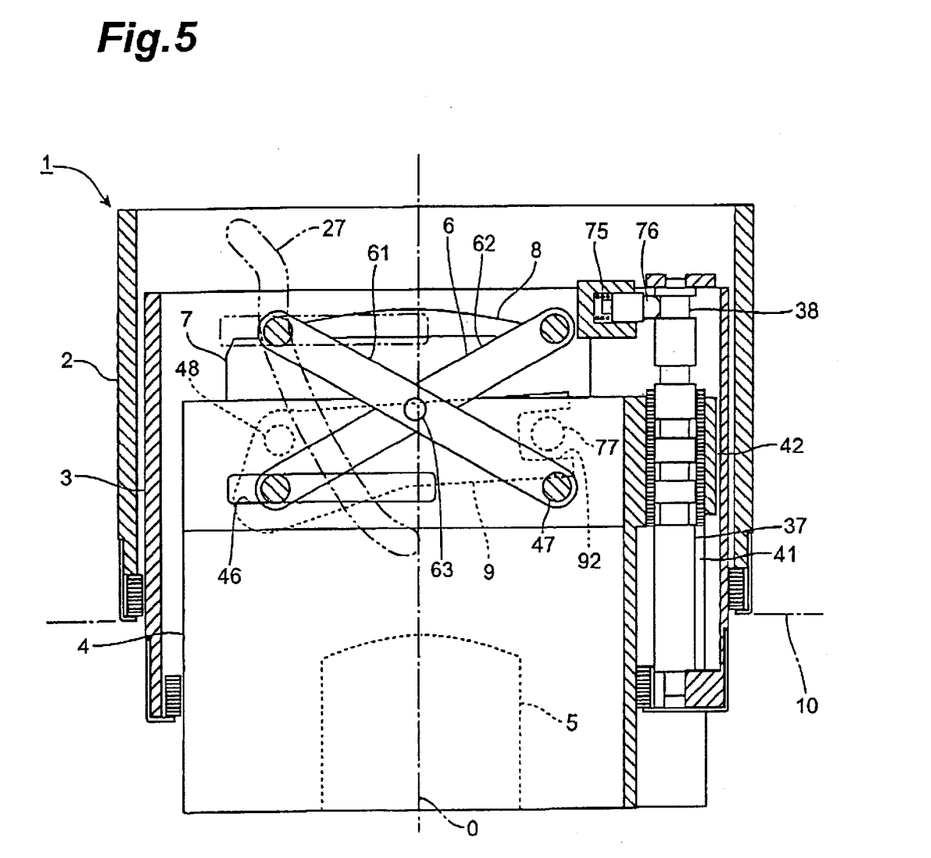
FIG. 5 is a view for explaining the operation of the camera having the lens barrel according to this embodiment

As shown in FIG. 5, when the intermediate barrel 3 retracts, the link mechanism 6 contracts, and the movable barrel 4 retracts. With this retracting operation of the movable barrel 4, the cam lever 9 pivots on the projection 48 toward the retracting side. However, since the notched portion 92 of the cam lever 9 is larger than the outer diameter of the projection 77 of the rear-group lens frame 7, the rear-group lens frame 7 does not move upon pivotal movement of the cam lever 9, but moves together with the intermediate barrel 3 while being held in the intermediate barrel 3. As a consequence, the front-group lens 5 of the movable barrel 4 approaches the rear-group lens 8 of the rear-group lens frame 7, and focusing is properly performed in the optical system made up of the front-group lens 5 and rear-group lens 8, thereby taking a wide-angle shot.

When the zooming operation of the camera 10 is performed for telephoto operation, the motor 29 is driven to rotate the feed screw 24 through the worm gear 28b and helical gears 28a and 25. With this rotation, the intermediate barrel 3 moves along the optical axis O to extend with respect to the fixed barrel 2.

Figure 6:
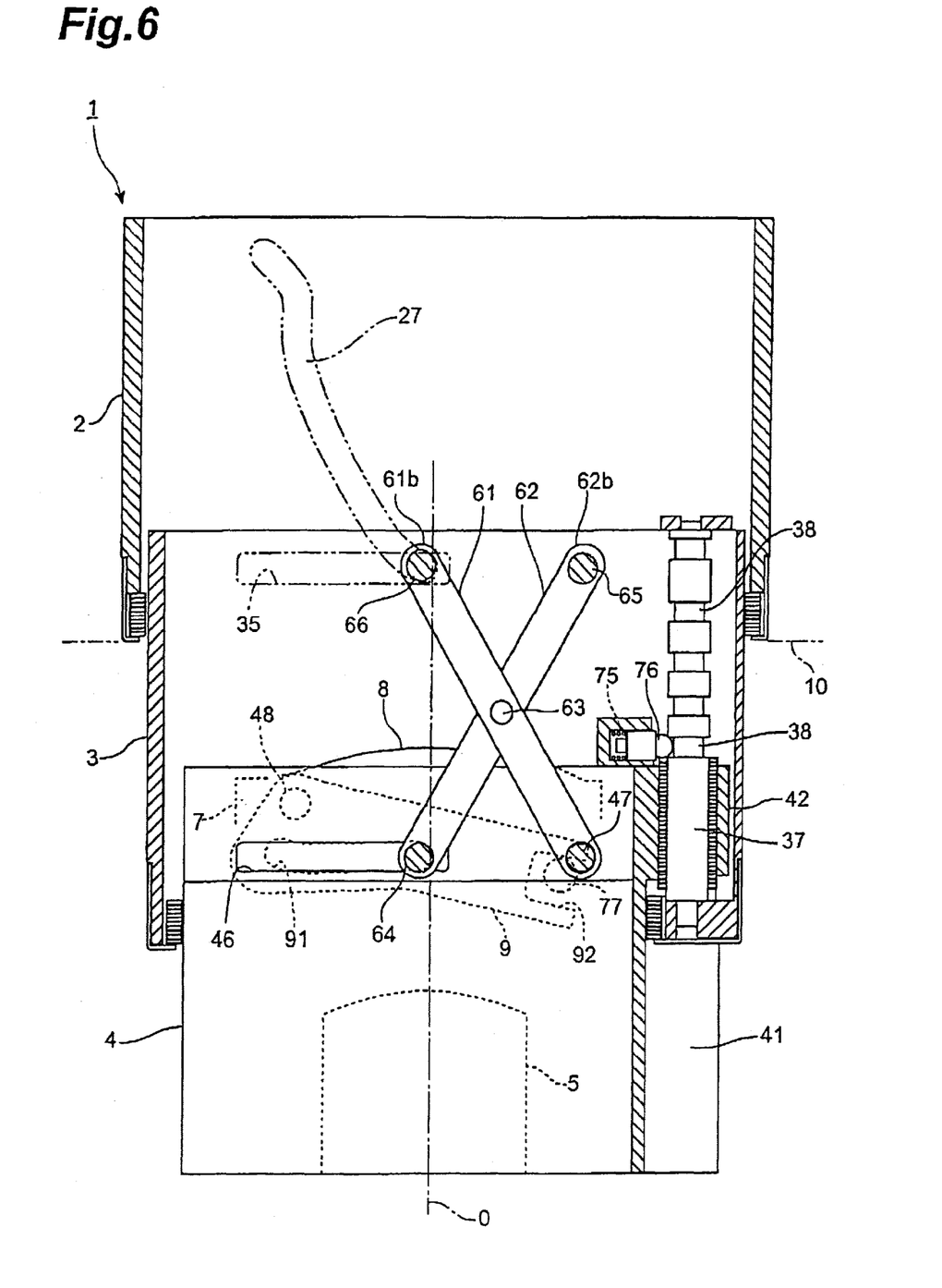
FIG. 6 is a view for explaining the operation of the camera having the lens barrel according to this embodiment.

As the fixed barrel 2 extends, the rear end 61b of the link mechanism 6 moves along the cam groove 27 and approaches the other rear end 62b, as shown in FIG. 6. As a consequence, the crossing angle between the links 61 and 62 increases, and the link mechanism 6 extends in the optical axis direction. This further extends the movable barrel 4 from the intermediate barrel 3 up to a telephoto position (TELE standby position).

The rear-group lens frame 7 accommodating the rear-group lens 8 is locked to the cam lever 9 axially fitted to the movable barrel 4. As the movable barrel 4 extends, therefore, the rear-group lens frame 7 moves forward along the optical axis O. At this time, the press member 76 of the rear-group lens frame 7 moves in the axial direction of the guide shaft 37 while being pressed against its outer surface. When the movable barrel 4 moves to the TELE standby position, the press member 76 is inserted into the groove 38 of the guide shaft 37 which is nearest to the distal end, and is held in the intermediate barrel 3. When the movable barrel 4 moves to the TELE standby position, zooming operation by the lens barrel 1 is complete.

When the shutter switch is pressed in this state, the motor 29 rotates in the reverse direction, and the feed screw 24 rotates in the reverse direction via the worm gear 28b and the helical gears 28a and 25, thereby retracting the intermediate barrel 3.

Figure 7:
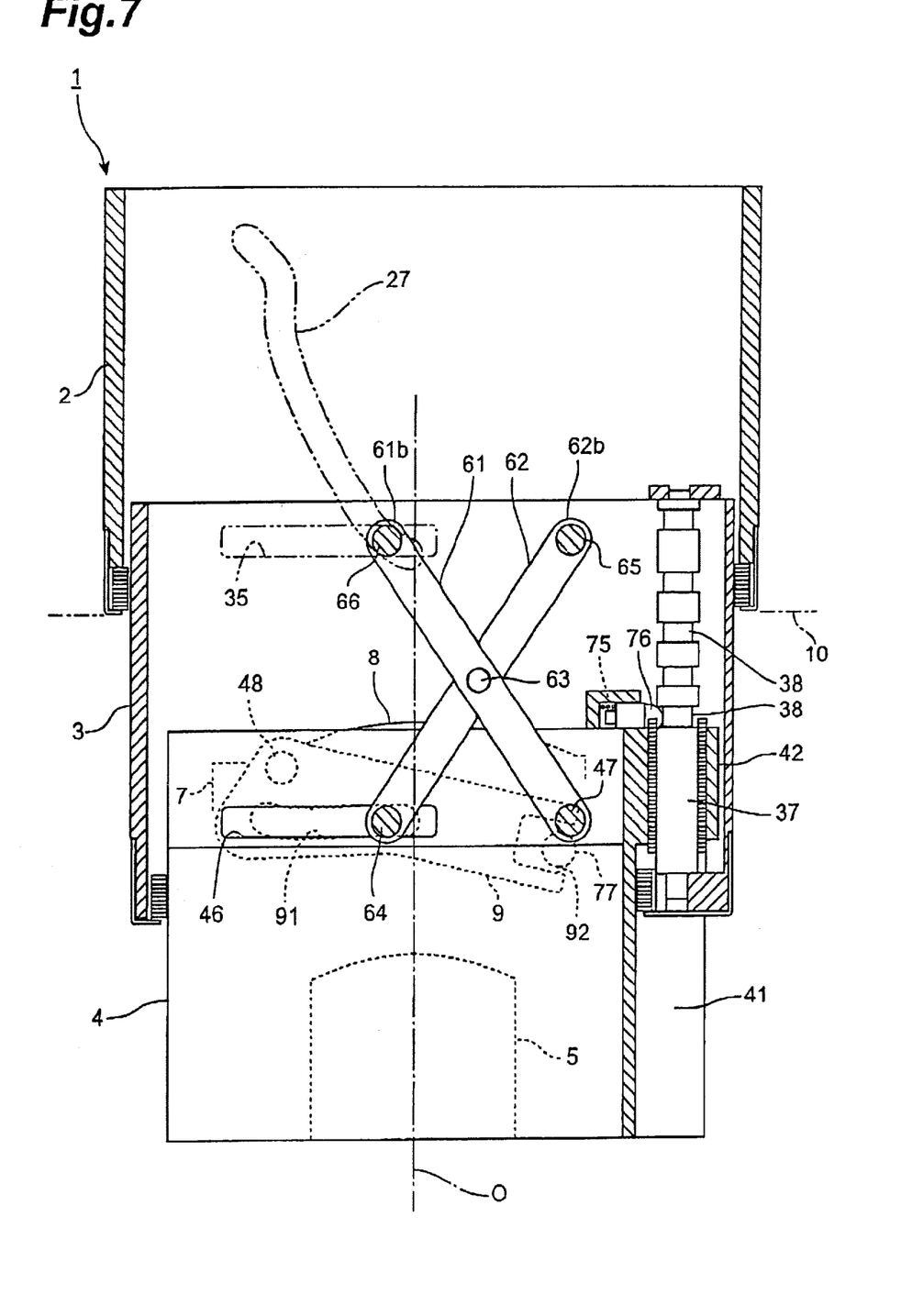
FIG. 7 is a view for explaining the operation of the camera having the lens barrel according to this embodiment.

As shown in FIG. 7, as the intermediate barrel 3 extends, the link mechanism 6 contracts, and the movable barrel 4 retracts. At this time, as the movable barrel 4 retracts, the cam lever 9 pivots toward the retracting side. Since the notched portion 92 of the cam lever 9 is larger than the outer diameter of the projection 77 of the rear-group lens frame 7, the rear-group lens frame 7 does not move upon this pivotal movement of the cam lever 9, but moves together with the intermediate barrel 3 while being held in the intermediate barrel 3. As a consequence, the front-group lens 5 of the movable barrel 4 approaches the rear-group lens 8 of the rear-group lens frame 7, and focusing is properly performed in the optical system made up of the front-group lens 5 and rear-group lens 8, thereby taking a telephoto shot.

Figure 8:
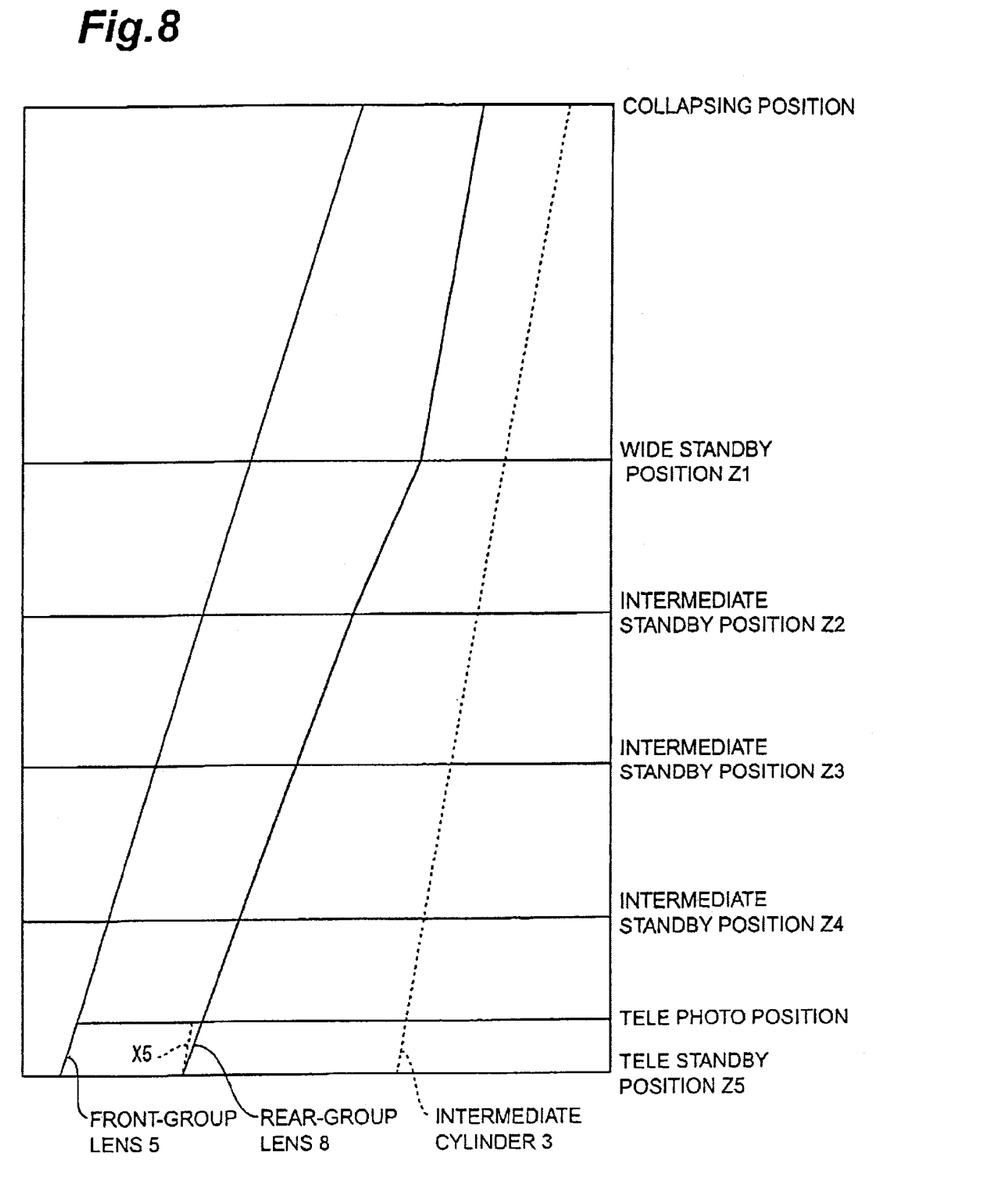
FIG. 8 is a view showing the loci of an intermediate barrel, front-group lens, and rear-group lens.

FIG. 8 shows the loci of the front-group lens 5 and rear-group lens 8 when the intermediate barrel 3 extends.

As shown in FIG. 8, when the intermediate barrel 3 extends from the collapsing position, the front-group lens 5 and rear-group lens 8 also extend forward from the camera 10 as the movable barrel 4 extends. At this time, the rear-group lens frame 7 is held in the intermediate barrel 3 between the collapsing position and a WIDE standby position Z1, and hence the rear-group lens 8 is translated by the same moving amount as that of the intermediate barrel 3. The front-group lens 5 moves together with the movable barrel 4.

When the intermediate barrel 3 further extends from the WIDE standby position Z1, the rear-group lens frame 7 moves by a larger amount than the intermediate barrel 3 and rear-group lens 8 as the cam lever 9 pivots. When the intermediate barrel 3 extends to a TELE standby position Z5, the press member 76 is inserted into the groove 38, and the rear-group lens frame 7 is held in the intermediate barrel 3. When the shutter is released in this state, the intermediate barrel 3 retracts for focusing. At this time, as indicated by a dashed line X5 in FIG. 8, the rear-group lens 8 moves together with the intermediate barrel 3, and the distance between the rear-group lens 8 and the front-group lens 5 decreases upon this movement, thereby properly focusing.

When the zoom lever of the camera 10 is operated for a wide-angle shot while the intermediate barrel 3 is placed at the TELE standby position Z5, the motor 29 drives, and the feed screw 24 rotates, thereby retracting the intermediate barrel 3. Upon this retracting operation, the link mechanism 6 contracts to retract the movable barrel 4. At this time, the rear-group lens frame 7 locked to the cam lever 9 moves along the optical axis O, together with the movable barrel 4, and stops at a position (e.g., the WIDE standby position Z1) at which the press member 76 is inserted into the groove 38 of the guide shaft 37. With this operation, zooming operation is performed in the optical system made up of the front-group lens 5 and rear-group lens 8.

When the shutter switch is pressed in this state, the motor 29 rotates in the reverse direction, and the feed screw 24 rotates in the reverse direction via the worm gear 28b and the helical gears 28a and 25, thereby extending the intermediate barrel 3. As the intermediate barrel 3 extends, the link mechanism 6 extends and so does the movable barrel 4. At this time, as the movable barrel 4 extends, the rear-group lens 8 pivots to the extended side. However, since the notched portion 92 of the cam lever 9 is larger than the outer diameter of the projection 77 of the rear-group lens frame 7, the rear-group lens frame 7 does not move upon pivotal movement of the cam lever 9, but moves together with the intermediate barrel 3 while being held in the intermediate barrel 3.

As a consequence, the front-group lens 5 of the movable barrel 4 separates from the rear-group lens 8 of the rear-group lens frame 7, and focusing is properly performed in the optical system made up of the front-group lens 5 and rear-group lens 8, thereby taking a wide-angle shot.

As described above, according to the lens barrel 1 of this embodiment, the movable barrel 4 can be made to accurately extend along the optical axis O by guiding it along the guide shaft 37. In addition, the formation of the notched portion 41 in the movable barrel 4 allows efficient use of the internal space 31 of the intermediate barrel 3 in which the guide shaft 37 is disposed, thereby housing the movable barrel 4 in the internal space 31. This makes it possible to accurately extend or retract the movable barrel 4 without increasing the size of the intermediate barrel 3.

The zooming operation of the optical system can be performed by moving the movable barrel 4 along the guide shaft 37. Thereafter, the rear-group lens 8 is brought near to or separated from the front-group lens 5 by changing the moving direction of the movable barrel 4, thus focusing the optical system. This makes it possible to perform zooming and focusing of the optical system by using a single driving source and driving mechanism for driving the movable barrel 4.

This embodiment is especially effective for an optical device designed to extract and retract the lens barrel 1 without rotating it.

The reaction force of the press member 76 that presses the guide shaft 37 can be received by the guide shaft 45. This can prevent rotational force around a second guide shaft from acting on the rear-group lens, and allows the rear-group lens to move properly along the optical axis direction.

In addition, when the intermediate barrel 3 and movable barrel 4 are retracted to collapse, the link mechanism 6 collapse at the rear end portion of the movable barrel 4 and intermediate barrel 3, and can be just housed in the rear end portion so as not to show outside the camera 10 even when the movable barrel 4 and intermediate barrel 3 extend to the maximum degree. In this way, the internal space of the camera 10 can be efficiently used to house the link mechanism 6, and the movable barrel 4 and intermediate barrel 3 can be elongated in the optical axis direction. This makes it possible to reduce the size of the camera 10.

Second Embodiment

The lens barrel 1 according to the first embodiment is associated with a two-stage extension lens barrel in which the intermediate barrel 3 and movable barrel 4 extend one by one from the fixed barrel 2. However, the present invention is not limited to such a lens barrel, and may be applied to a lens barrel designed to zoom in three or more stages by extending three or more barrels from the fixed barrel 2. In such a lens barrel as well, the same effects as those of the lens barrel 1 according to the first embodiment can be obtained.

Third Embodiment

In the first and second embodiments, lens barrels for cameras designed to take pictures by using photographic films have been described. However, the lens barrel of the present invention is not limited to them. The present invention can be applied to lens barrels for other types of optical devices such as electronic still cameras and video cameras as long as they have optical systems each including front- and rear-group lenses that move along the optical axis.

As has been described above, according to the present invention, the following effects can be obtained.

The optical system can be accurately extended along the optical axis by guiding the second barrel along the guide shaft. In addition, a notched portion is formed in the second barrel to allow efficient use of the internal space of the first barrel in which the guide shaft is disposed, thereby housing the second barrel therein. This makes it possible to accurately extend and retract the second barrel without increasing the size of the first barrel.

What is claimed is:

1. A lens barrel used in an optical system of an optical device comprising:

a first barrel which can move along an optical axis of an optical system,       accommodates a guide shaft directed parallel to the optical axis, and       has an angular cross section transverse to the optical axis; and    a second barrel which       has an angular cross section, transverse to the optical axis, along part of a length of said second barrel along the optical axis, and a notched angular cross section along part of the length of said second barrel as a notched portion,       has a bearing at the part of said second barrel having the angular cross section and behind said notched portion, through which the guide shaft extends, and       can extend and retract with respect to said first barrel.

2. The lens barrel according to claim 1, wherein the guide shaft is disposed on a comer portion inside said second barrel.

3. The lens barrel according to claim 1, wherein said first barrel can extend and retract with respect to a body of an optical device upon movement of said first barrel.

4. The lens barrel according to claim 1, wherein the optical device is a camera.

5. The lens barrel according to claim 1, wherein the optical system is a zoom optical system of a photographing lens.

* * * * *